Feb. 7, 1967 C. T. TURNER ETAL 3,302,506
PRINTER-SLOTTER MULTIPLE HEAD LOCK
Filed Dec. 4, 1964 8 Sheets-Sheet 1

INVENTORS
Charles T. Turner
and Orville L. Appler
BY Thomas W. Y. Clark
ATTORNEY Feb. 7, 1967 C. T. TURNER ETAL 3,302,506
PRINTER-SLOTTER MULTIPLE HEAD LOCK
Filed Dec. 4, 1964 8 Sheets-Sheet 2
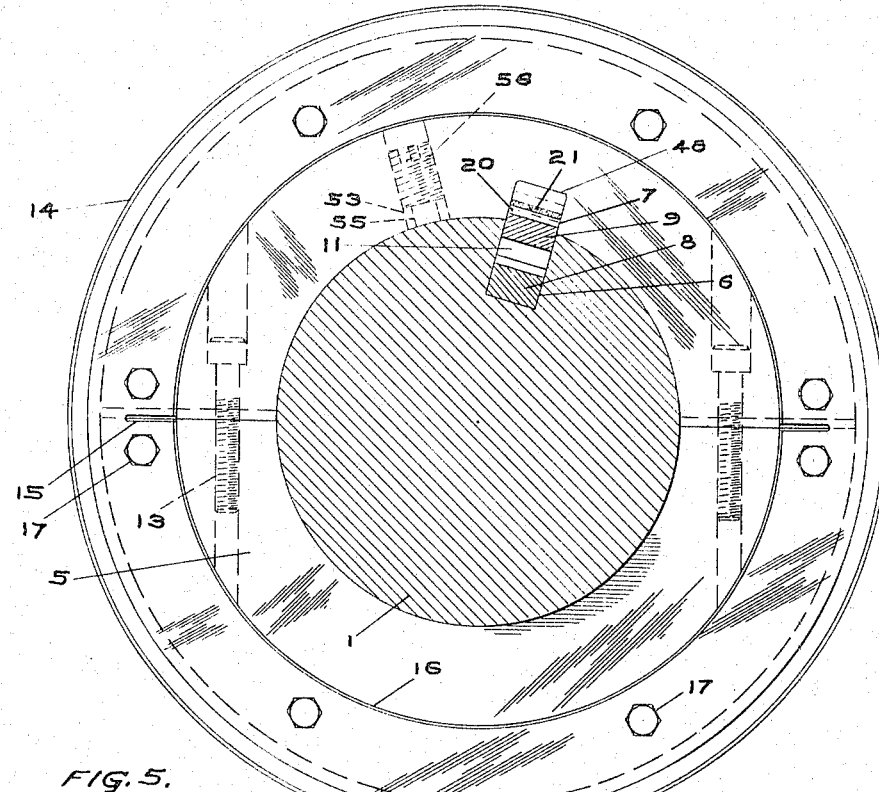
FIG. 5.
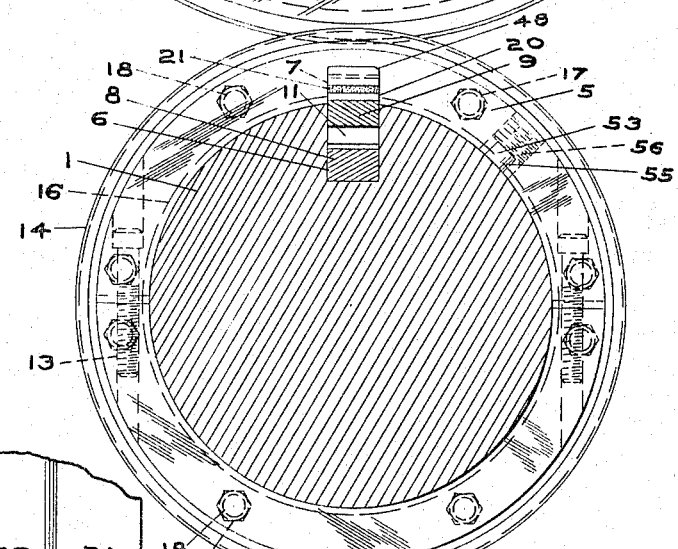
FIG. 6.
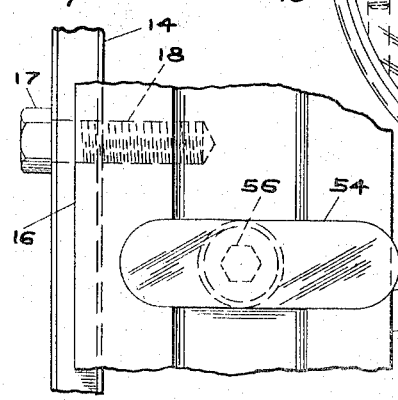
INVENTORS
Charles T. Turner and
Orville L. Appler
BY Thomas W. J. Clark
ATTORNEY

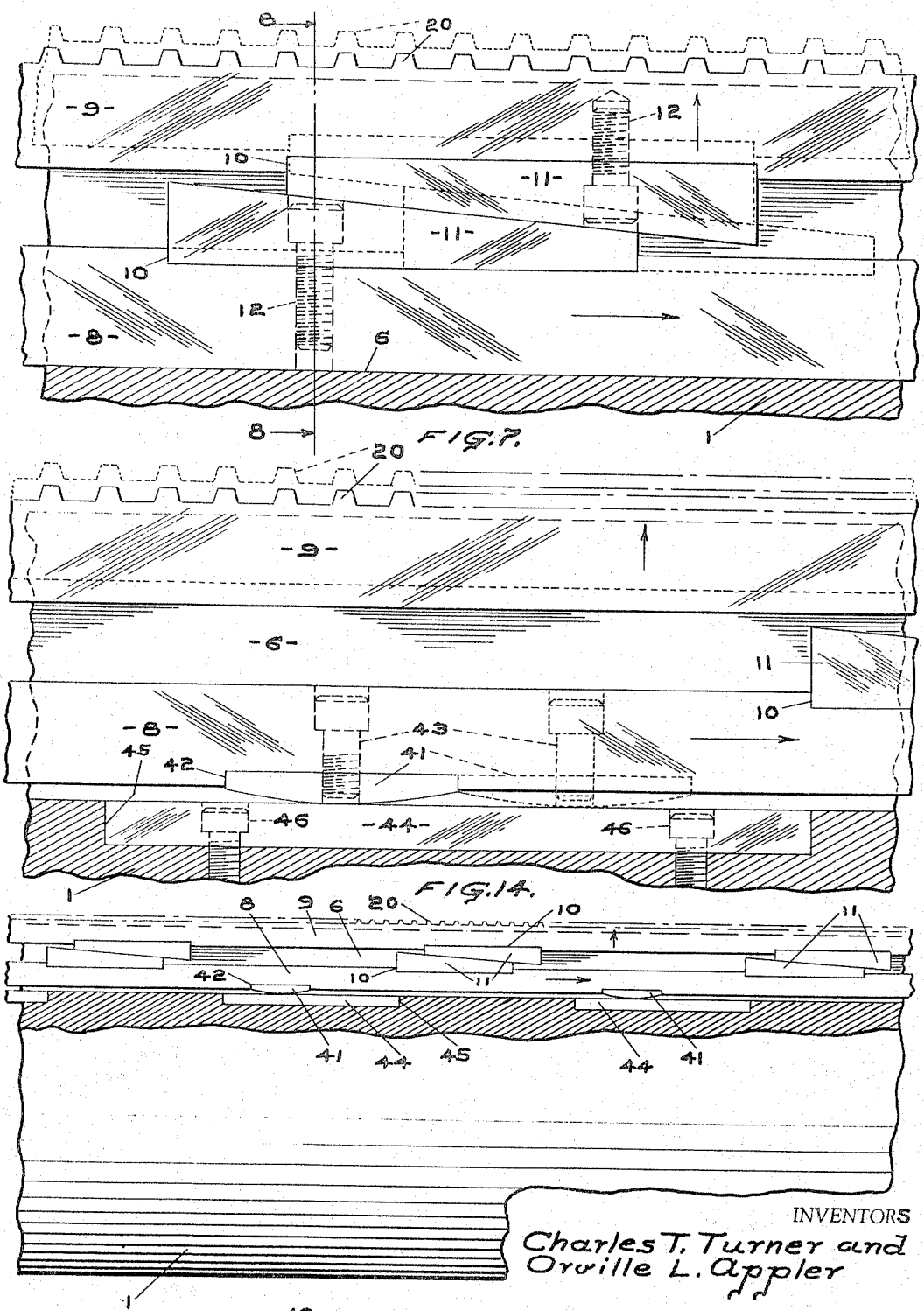

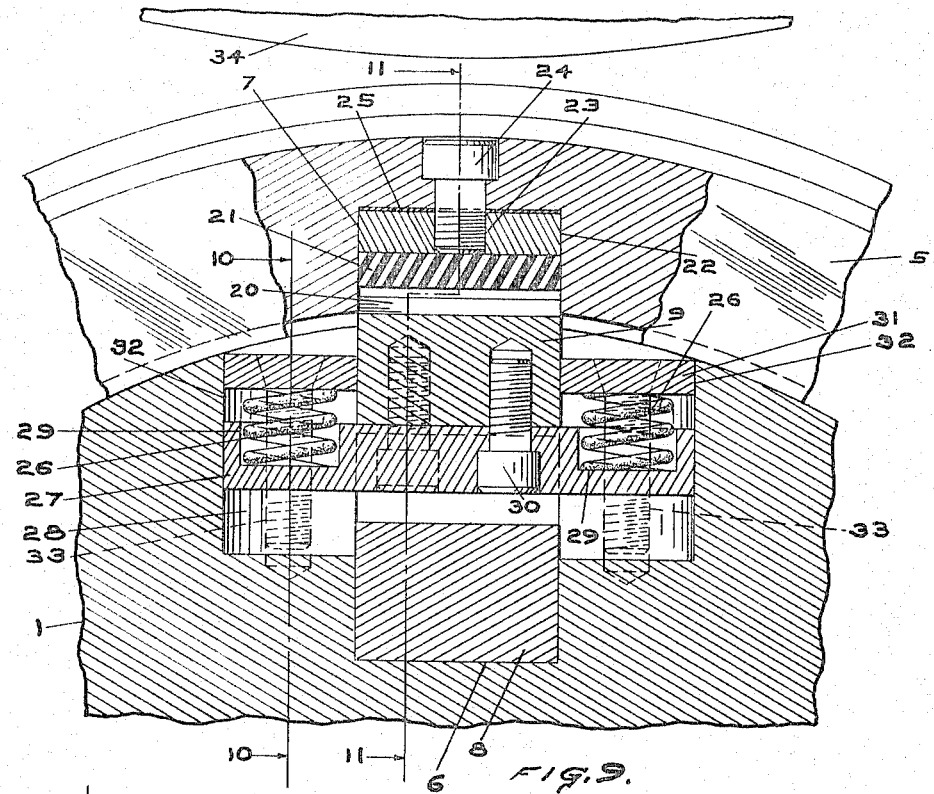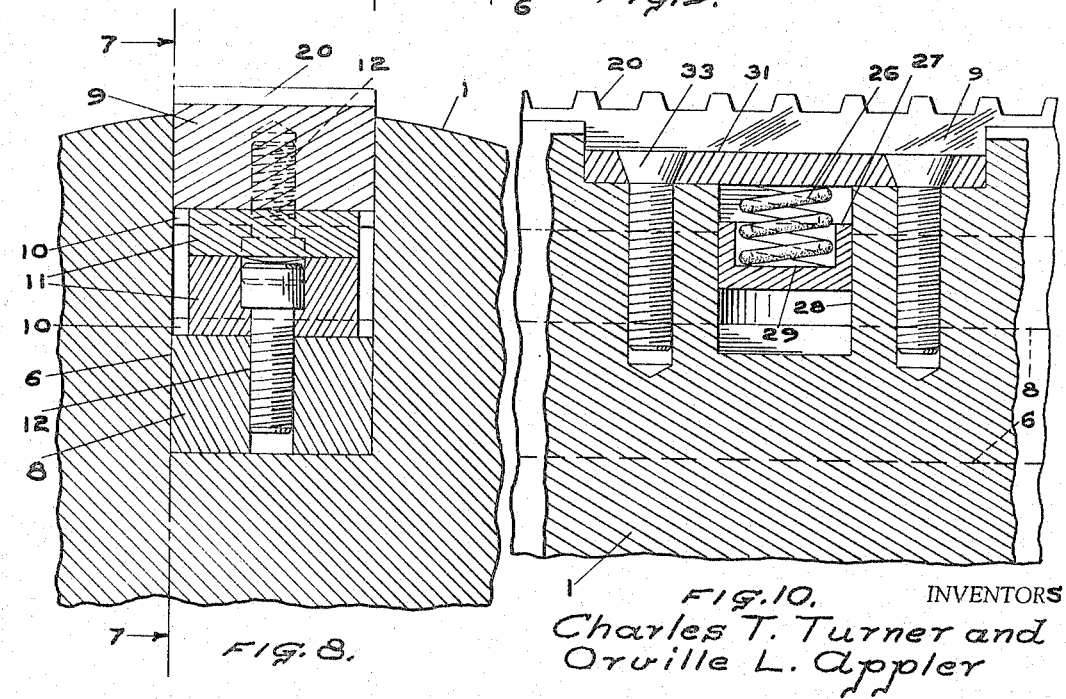

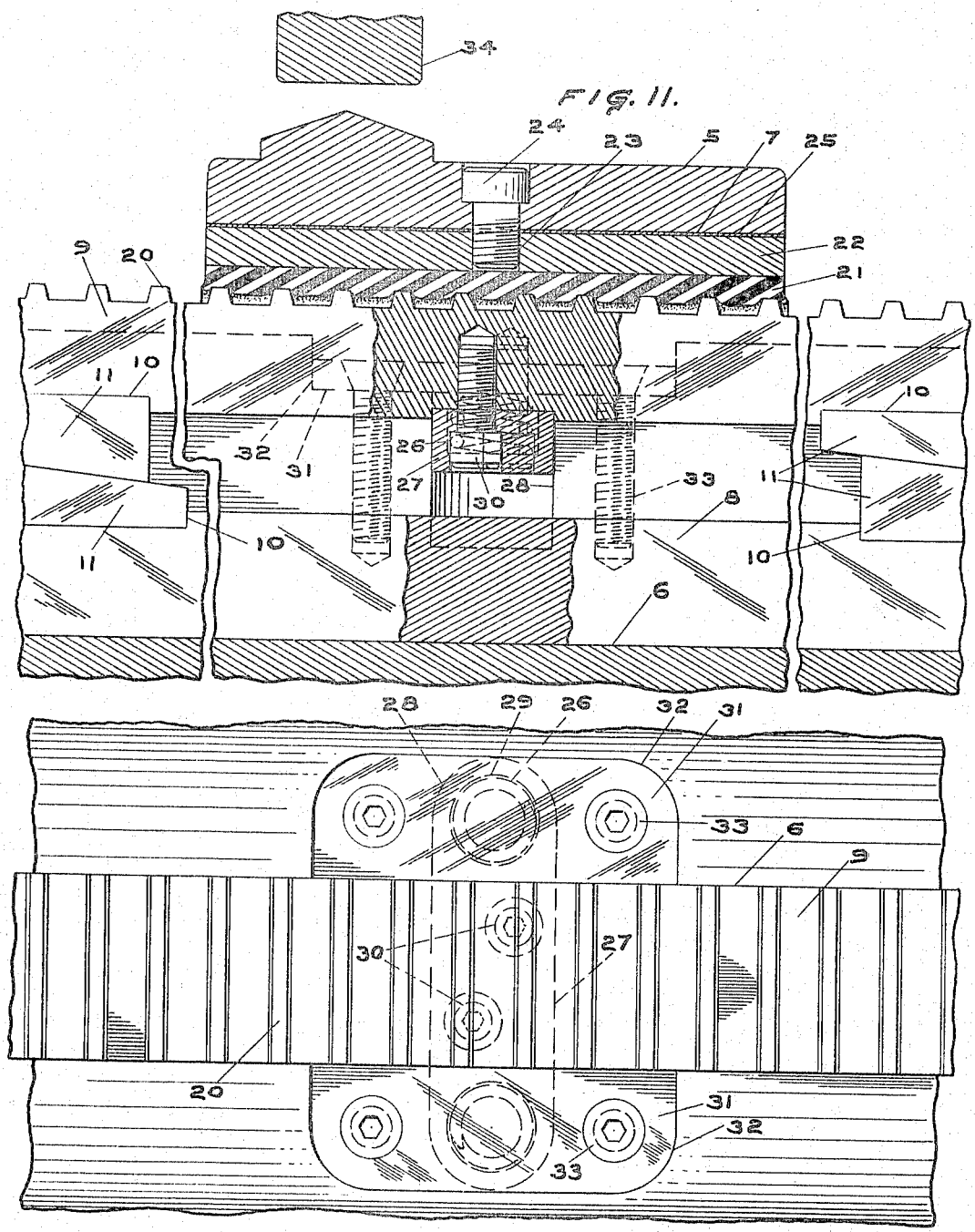

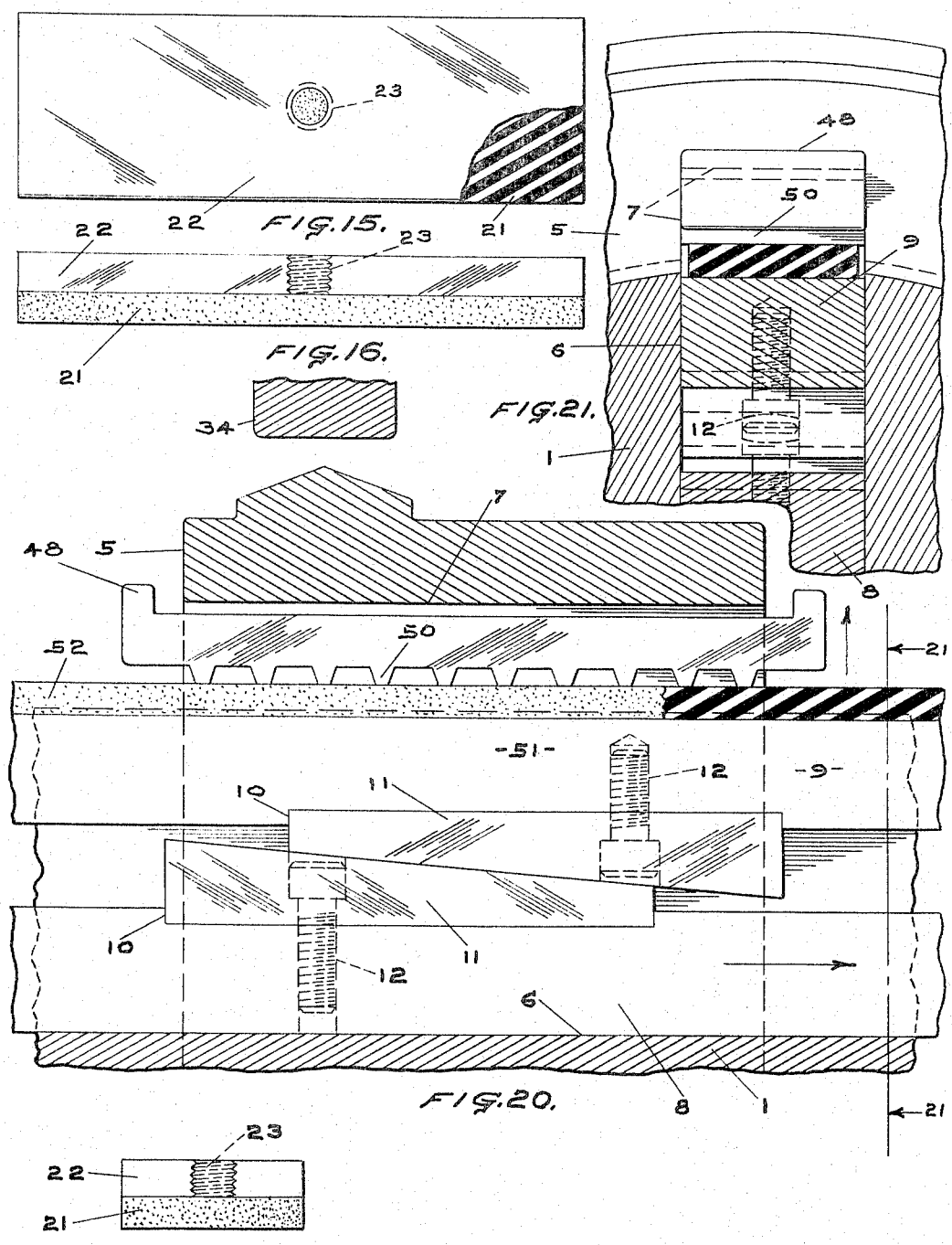

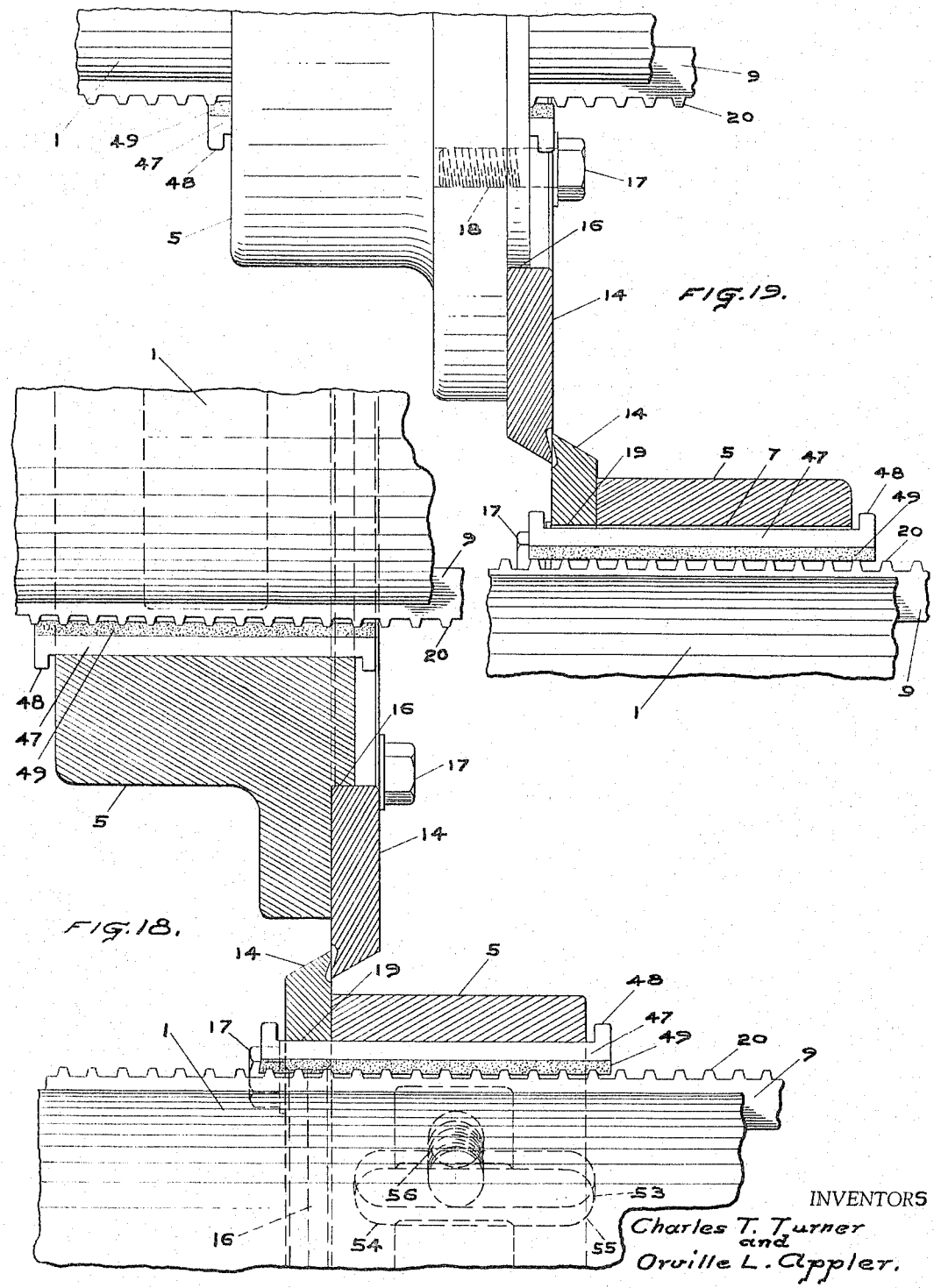

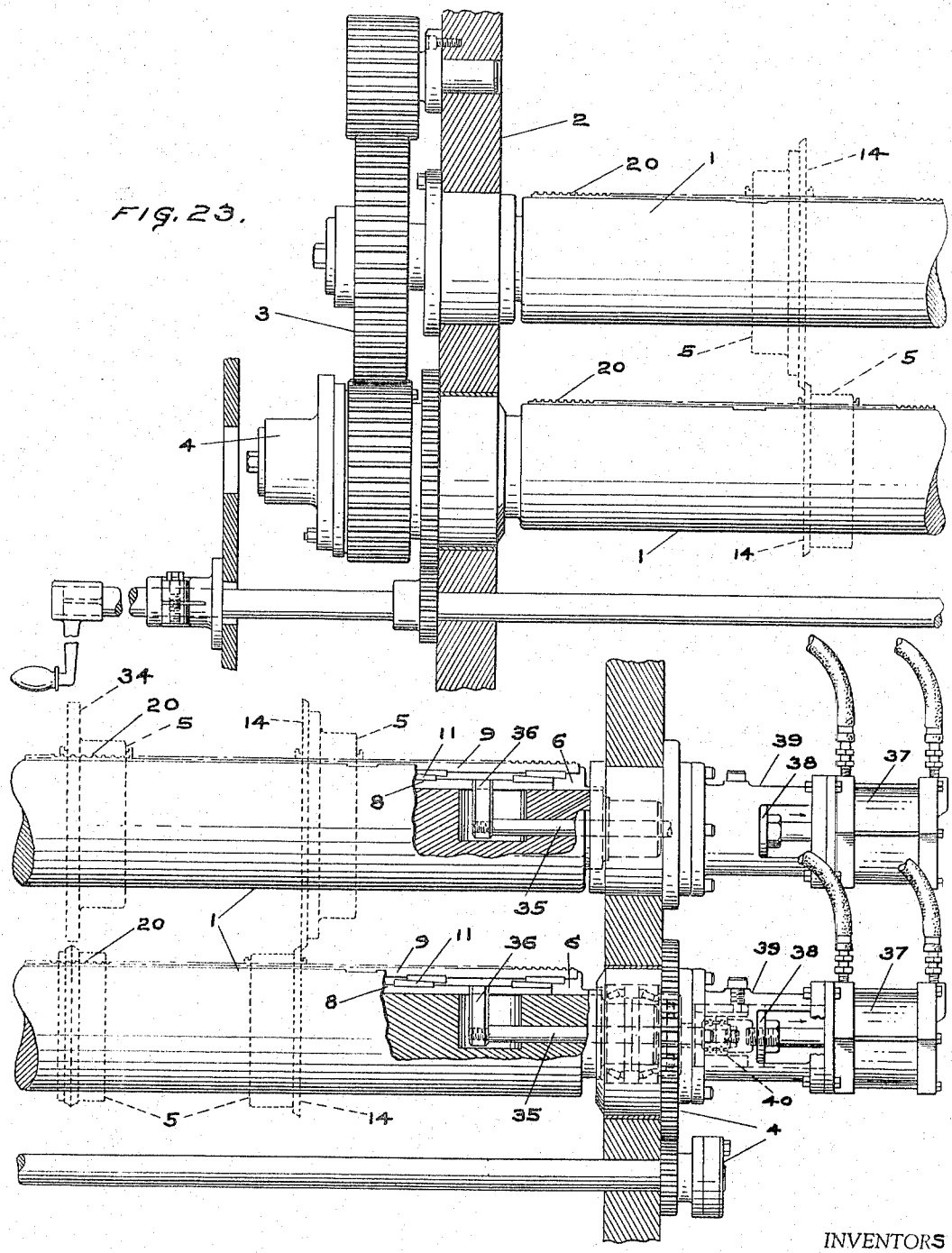

United States Patent Office 3,302,506
Patented Feb. 7, 1967

3,302,506
PRINTER-SLOTTER MULTIPLE HEAD LOCK
Charles T. Turner and Orville L. Appler, Baltimore, Md., assignors to Flynn & Emrich Company, Baltimore, Md., a corporation of Maryland
Filed Dec. 4, 1964, Ser. No. 415,936
11 Claims. (Cl. 83—665)

The present invention relates to a machine for operating on sheet material such as corrugated board and particularly to a multiple head locking device for creasing, scoring, slotting, slitting and trimming heads on the shafts of printer-slotters. Although the head lock is designed primarily for use on printer-slotters for use in operating on corrugated blank stock, it is apparent that it may be used on machines performing similar operations on single thickness blanks in which multiple heads in pairs are mounted on their respective shafts and are adjustable laterally from time to time for performing their operations on different sizes or different desired configurations. The object of the head locks for the multiple heads of this invention is to provide a mechanism which will allow the press operator to unlock all heads on any one shaft at one time in one operation and after they have been reset or repositioned to again lock them on the shaft by a single operation. The shafts carrying the operating heads in the printer-slotter are mounted in the side frames of the machine and the heads are rotated at the proper speed to perform their respective functions.

Further objects and advantages of the invention will be apparent from the following description and the accompanying drawings forming a part hereof and illustrating the preferred modification of the mechanism with several modified forms that have particular advantages.

In the drawings:

FIGURE 5 is a transverse sectional view through the shafts showing upper and lower slitting heads with their blades in overlapped operative position.

FIGURE 6 is a fragmentary view from the interior of the head showing the alternate locking mechanism.

FIGURE 7 is a longitudinal sectional view taken on the line 7—7 of FIGURE 8 through the shaft showing the bars for locking the head in place.

FIGURE 8 is a transverse sectional view of FIGURE 7 taken on line 8—8.

FIGURE 9 is a transverse sectional view illustrating the means for withdrawing the locking bar from locking position.

FIGURE 10 is a longitudinal sectional view taken on line 10—10 of FIGURE 9.

FIGURE 11 is a longitudinal sectional view on line 11—11 of FIGURE 9 showing the locking bar in locking engagement with the head.

FIGURE 12 is a fragmentary plan view of the shaft showing the mechanism for removing the locking bar from engaged position.

FIGURE 13 is a longitudinal sectional view of the shaft showing a modification of the mounting for the lift bar.

FIGURE 14 is a longitudinal sectional view of the same modification as FIGURE 13 but showing the details of the structure and the lift and locking bars in operative position in dotted lines.

FIGURE 15 is a top plane view partly broken away showing the mounting of the resilient material on its backing as used in the keyway of the head.

FIGURE 16 is a longitudinal elevational view thereof.

FIGURE 17 is an end view of FIGURE 16.

FIGURE 18 is a longitudinal sectional view of the knife bearing heads with both heads locked on their respective shafts and showing a novel and improved form of head locking key or plate.

FIGURE 19 is a similar but partial sectional view with the top head in locked and engaged position and the lower head disengaged, with the knives reversed.

FIGURE 20 is a longitudinal sectional view of a modification showing the resilient member on the locking bar.

FIGURE 21 is a transverse sectional view of FIGURE 20 on line 21—21 of FIGURE 20.

FIGURE 22 is an elevational view partly in section showing the upper and lower right side shaft assembly together with the lift bar operating mechanism.

FIGURE 23 is a continuation of the shafts of FIGURE 22 of the left side showing the drive mechanism for the shafts.

In the drawings similar numerals refer to similar parts throughout the several views.

Figure 1:
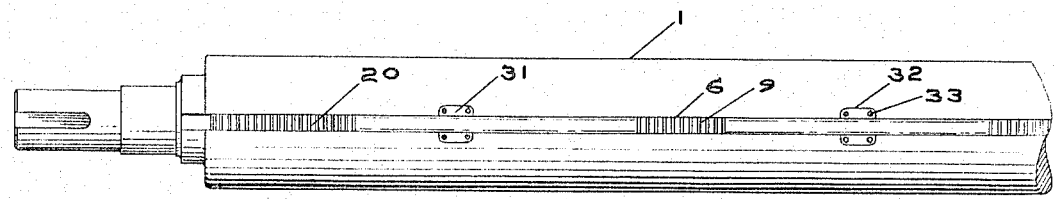
FIGURE 1 is a plan view of the left hand end of a shaft on which the heads are locked.
Figure 2:
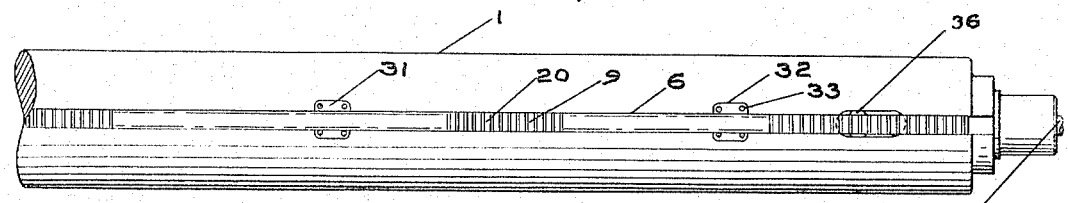
FIGURE 2 is a similar view and a continuation of FIGURE 1 of the right hand end of the shaft.

The shaft 1 shown in FIGURES 1 and 2 may be either the upper or the lower shaft in FIGURES 22 and 23 and these two shafts are mounted in side frame 2 of the printer-slotter and the shafts are driven by gears 3 mounted on their left ends as shown in FIGURE 23 and the lower shaft includes on both ends roll eccentric adjustment mechanisms 4, parts of which are somewhat detailed on the right side of the machine as illustrated in FIGURE 22.

The shafts 1 may have a plurality of heads such as 5 mounted thereon and indicated by fine dotted lines. The shafts each have a radial, preferably rectangular longitudinally extending slot 6 cut therein. The heads likewise have a similarly extending keyway 7 cut therein and that registers and is in alignment therewith.

Two bars are mounted in slot 6, a lifting bar 8 is in the base of the slot and a locking bar 9 is in the upper portion of the slot. Both these bars extend substantially the length of the shaft with the locking bar projecting slightly outside the periphery of the shaft. These rectangularly sectioned bars have longitudinally extending seats 10 cut in their opposing faces. In these seats 10 are mounted opposing wedges 11 both the wedges fitting snugly at their ends into the seats 10, the ends of the seats receiving the pressure of the wedges longitudinally of the bars. The wedges 11 are attached to their respective bars by screws 12, but it is noted that the only function of these screws is to hold the wedges in their respective seats. In the preferred modification as illustrated in FIGURES 7, 8 and 9, the lift bar 8 rests on the bottom of the slots in the shaft.

The head 5 is made in two halves fastened together by screws 13 on each side. The blade 14 is partially cut out as at 15 to provide a split line when the blade is divided in two, to mount on the head, and it is fastened to the head by screws 17 passing into the threaded openings 18 in the head. The blade 14 as identified with the lower head is likewise cut out as at 19 to register with the keyway 7 in the head.

The locking bar 9 extends slightly above the periphery of the shaft 1 into the keyway 7 in the head. The locking bar preferably has thereon teeth 20 which upon the elevation of the locking bar bear into the rubber or resilient pad 21 in the keyway of the head. The term "rubber" is used to designate rubber or any of the various rubberlike compositions suitable to the purpose in hand. It is flexible and penetrable and resumes its original configuration upon the release of pressure upon it. The rubber or resilient pad 21 is permanently affixed to a metal backing 22 which is centrally threaded as at 23 to receive a screw 24 to hold the resilient pad in the keyway 7. Since several heads are mounted on the same shaft, and the tolerances in the keyway 7 and slot 6 are fairly close, shims 25 may be placed between the metal backing 22 and the seat of the keyway 7, for purposes of compensating for variations of locking pressures between the teeth of the locking bar and the rubber pad.

Upon raising the locking bar the teeth 22 impinge upon the resilient pad 21 as shown in FIGURE 11 and upon the withdrawal of the lift bar to lower the locking bar it is essential that the teeth be released and not hold the head from longitudinal movement. Were the locking bar at the bottom of the shaft, instead of the top as shown, the release would have to be positive. The release of the teeth from the resilient member is obtained by the springs 26 mounted on transverse plate 27 in the shaft in a cutout slot 28 in the shaft. This transverse plate 27 preferably has pockets 29 therein to receive the springs. The transverse plate by screws 30 is rigidly attached to the locking bar 9. Side plates 31 are set inside openings 32 extending longitudinally in the shaft and they are held fast therein by the screws 33. The outer ends of the springs 26 bear on the side plates 31 as best shown in FIGURES 9, 10 and 12. The transverse plate 27 in moving in slot 28 allows radial movement of locking bar 9 in slot 6 in the shaft 1 but prevents longitudinal or axial movement, so that the reaction of the opposing wedges 11 on each other is fully effective to elevate the locking bar 9. In FIGURES 9, 11 and 20 the heads are illustrated as being creaser heads with a flat opposing head 34 opposite the creaser.

The lifting bar 8 is moved longitudinally in the rolls 1 by the pull rod 35 connected to the lift bar 8 by the connecting arm 36. A fluid operated piston is in cylinder 37 which operates crosshead 38 in guide housing 39, the crosshead operating the pull rod through the ball bearing connection 40 therewith.

A modification of the mounting of the lift bar 8 is shown in FIGURES 13 and 14 in which the lift bar is spaced from the bottom of the slot 6 in the shaft 1. Hardened shoes 41 are placed in the cutouts 42 in the bottom face of the lift bar adjacent the bottom of the slot 6 and these are held in the cutouts 42 by screws 43. A hardened slide plate 44 is likewise placed in the cutouts 45 in the shaft and held therein by screws 46. These shoes 41 are placed midway between the adjacent wedges on the lift bar. This gives some resilience to the lift bar and avoids the rigid locking of the locking bar on a head which might be exactly radial of the facing wedges, allowing more freedom of movement of the bars so that they will secure other heads on a given shaft firmly in place. It is most desirable that when the lifting bar is moved to a rigid holding stop that all the heads be engaged by the locking bar and the slight flexing of the lifting bar promotes this firm hold as does the proper thickness of the shims 25 in each head.

Another modification is illustrated in FIGURES 18 and 19 in which the backing plate 22 with its rubber pad 21 on its face is replaced by a U shaped member 47 which has upturned or radial ends 48 at its ends to prevent its withdrawal from the heads. This U shaped member has a rubber pad 49 cemented or vulcanized to its inside face and is not rigidly screwed to the head. It is primarily useful when knives are mounted on the head as shown in these FIGURES 18 and 19. Whenever the knives do not contact to make a smooth cut, a slight tap on the head will move the head lengthwise of the shaft 1 ever so slightly even while the head is locked upon the shaft and the knives are running. Because of the smooth engagement between the U shaped member 47 in the keyway 7, the head will move enough to give a smooth cut to the stock. The primary purpose of the upturned ends 48 is to provide means when the locking bar is in unlocked position and the heads are shifted to new positions along the shaft 1, the U shaped member 47 with its pad 49, will be carried along with the head to its new position.

A still further modification is illustrated in FIGURES 20 and 21 in which the U shaped member has on its face adjacent the locking bar, teeth 50 and the locking bar 51 has the resilient member 52 fixedly attached to it by cement or vulcanization. This simply makes a reversal of the teeth and the resilient member on the respective opposite members. This modification is illustrated in these figures on a head similar to that shown in FIGURE 11.

Figure 4:
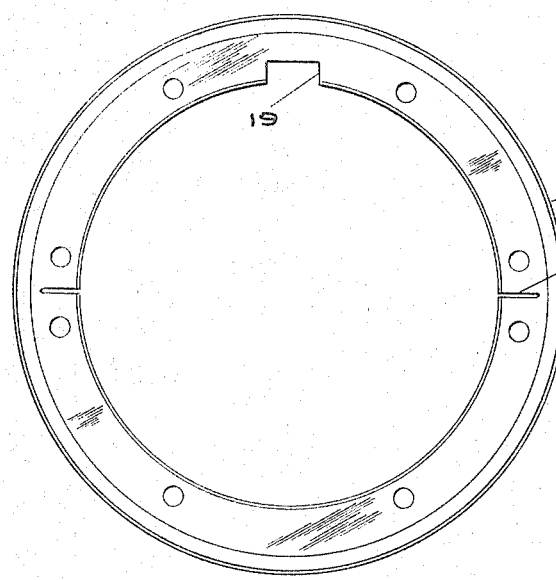
FIGURE 4 is a front elevational view of a knife or blade designed for mounting on the head of FIGURE 3.
Figure 3:
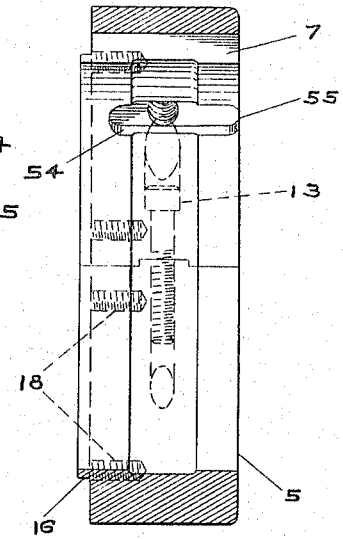
FIGURE 3 is a sectional view showing the inside half of a head.

It is preferable that the heads also contain the customary but new form of locking or clamping device illustrated in FIGURES 3, 6 and 18 in which a plate 53 is mounted in a slot 54 in the head which extends longitudinally of the shaft, and the slot 54 is cut out as shown at 55 to allow a slight projection of the plate 53 beyond the side of the head so that the operator may know that a standby or alternate holding plate is within the opening. The holding key is held tightly against the shaft by a screw 56. This is an alternate to the locking mechanism of the present invention and need not be used while the locking device of the present invention is in use.

The preferred and several modified forms of the invention have been described in detail in order that the manner of constructing and operating the invention may be understood. However, the specific terms herein are used in a descriptive rather than a limiting sense, the scope of the invention being defined in the claims.

What is claimed as new and is desired to be secured by Letters Patent is:

1. A multiple head lock for printer-slotters and the like including a shaft mounted for rotation around an axis and having blank working heads longitudinally adjustable thereon, the periphery of the shaft closely fitting the hub of the heads, the heads having a keyway in their inner surface, the shaft having a radial longitudinally adjustable lift bar in the base of said slot, a radially movable locking bar spaced radially outside the lift bar in the slot and extending into the keyway in the heads to axially locate the heads on the shaft, means in the keyway to receive the impingement of the locking bar thereon, said bars having a plurality of mutually engaging longitudinally spaced wedges on adjacent faces thereof, whereby longitudinal movement of the lift bar projects the locking bar to locking position against said means in the keyway in the heads, to lock the heads longitudinally on the shaft, the keyway in the interior surface of the hub of the head having a resilient pad facing the shaft secured in said keyway, the locking bar having teeth projecting radially outwardly thereon and projecting into said keyway and on extending the locking bar by adjustment, firmly impinging upon the resilient pad to lock the head on the shaft.

2. A multiple head lock for printer-slotters and the like including a shaft mounted for rotation around an axis and having blank working heads longitudinally adjustable thereon, the periphery of the shaft closely fitting the hub of the heads, the heads having a keyway in their inner surface, the shaft having a radial longitudinally extending slot therein parallel to the shaft axis, a longitudinally adjustable lift bar in the base of said slot, a radially movable locking bar spaced radially outside the lift bar in the slot and extending into the keyway in the heads to axially locate the heads on the shaft, means in the keyway to receive the impingement of the locking bar thereon, said bars having a plurality of mutually engaging longitudinally spaced wedges on adjacent faces thereof, whereby longitudinal movement of the lift bar projects the locking bar to locking position against said means in the keyway in the heads, to lock the heads longitudinally on the shaft, a key in the keyway in the head and to which a resilient pad is affixed, the key having retaining projections radially directed from the shaft on each end outside the head and spaced therefrom, whereby the head may be moved slightly to either side of its position when locked on the shaft, without releasing the locking bar.

3. A multiple head lock for printer-slotters and the like including a shaft mounted for rotation around an axis and having blank working heads longitudinally adjustable thereon, the periphery of the shaft closely fitting the hub of the heads, the heads having a keyway in their inner surface, the shaft having a radial longitudinally extending slot therein parallel to the shaft axis, a longitudinally adjustable lift bar in the base of said slot, a radially movable locking bar spaced radially outside the lift bar in the slot and extending into the keyway in the heads to axially locate the heads of the shaft, means in the keyway to receive the impingement of the locking bar thereon, said bars having a plurality of mutally engaging longitudinally spaced wedges on adjacent faces thereof, whereby longitudinal movement of the lift bar projects the locking bar to locking position against said means in the keyway in the heads, to lock the heads longitudinally on the shaft, the keyway in the interior surface of the hub of the head having a resilient pad facing the shaft secured in said keyway, the locking bar having teeth projecting radially outwardly thereon and projecting into said keyway and on extending the locking bar by adjustment, firmly impinging upon the resilient pad to lock the head on the shaft including spring means on the locking bar to retract the locking bar from impingement with the resilient pad in the head upon the withdrawal of the lifting bar from head locking position.

4. A multiple head lock for printer-slotters and the like including a shaft mounted for rotation around an axis and having blank working heads longitudinally adjustable thereon, the periphery of the shaft closely fitting the hub of the heads, the heads having a keyway in their inner surface, the shaft having a radial longitudinally extending slot therein parallel to the shaft axis, a longitudinally adjustable lift bar in the base of said slot, a radially movable locking bar spaced radially outside the lift bar in the slot and extending into the keyway in the heads to axially locate the heads on the shaft, means in the keyway to receive the impingement of the locking bar thereon, said bars having a plurality of mutually engaging longitudinally spaced wedges on adjacent faces thereof, whereby longitudinal movement of the lift bar projects the locking bar to locking position against said means in the keyway in the heads, to lock the heads longitudinally on the shaft, the keyway in the interior surface of the hub of the head having a resilient pad facing the shaft secured in said keyway, the locking bar having teeth projecting radially outwardly thereon and projecting into said keyway and on extending the locking bar by adjustment, firmly impinging upon the resilient pad to lock the head on the shaft, shims positioned between the resilient pad and the base of the keyway in the heads to substantially equalize the spacing of the resilient pad of the respective heads on said shaft from the teeth on the locking bar.

5. A multiple head lock for printer-slotters and the like including a shaft mounted for rotation around an axis and having blank working heads longitudinally adjustable thereon, the periphery of the shaft closely fitting the hub of the heads, the heads having a keyway in their inner surface, the shaft having a radial longitudinally extending slot therein parallel to the shaft axis, a longitudinally adjustable lift bar in the base of said slot, a radially movable locking bar spaced radially outside the lift bar in the slot and extending into the keyway in the heads to axially locate the heads on the shaft, means in the keyway to receive the impingement of the locking bar thereon, said bars having a plurality of mutually engaging longitudinally spaced wedges on adjacent faces thereof whereby longitudinal movement of the lift bar projects the locking bar to locking position against said means in the keyway in the heads to lock the heads longitudinally on the shaft, the head lock lift bar being spaced from the base of the slot in the shaft and including spacing shoes between the lift bar and the base of the slot, the spacing shoes being fixed to the lift bar, and also being spaced longitudinally of the bar substantially midway between the wedges on the opposite face thereof.

6. A multiple head lock for printer-slotters and the like including a shaft mounted for rotation around an axis and having blank working heads longitudinally adjustable thereon, the periphery of the shaft closely fitting the hub of the heads, the heads having a keyway in their inner surface, the shaft having a radial longitudinally extending slot therein parallel to the shaft axis, a longitudinally adjustable lift bar in the base of said slot, a radially movable locking bar spaced radially outside the lift bar in the slot and extending into the keyway in the heads to axially locate the heads on the shaft, means in the keyway to receive the impingement of the locking bar thereon, said bars having a plurality of mutually engaging longitudinally spaced wedges on adjacent faces thereof, whereby longitudinal movement of the lift bar projects the locking bar to locking position against said means in the keyway in the heads, to lock the heads longitudinally on the shaft, the head lock including a transverse plate affixed to the locking bar, the shaft having a transverse cavity receiving the plate therein, the plate moving radially in said cavity with the locking bar adjustment, the plate preventing longitudinal movement of the locking bar in the shaft slot, the shaft also having longitudinally extending cavities on each side of the locking bar and extending longitudinally of the shaft, to each side of the transverse plate cavity, holding plates secured in said longitudinally extending cavities radially outside the ends of the transverse plate, and compression springs between the holding plates and each end of the transverse plate to withdraw the locking bar from head locking position upon withdrawal of the lifting bar from locking position.

7. A multiple head lock for printer-slotters and the like including a shaft mounted for rotation around an axis and having one or more working heads rotatable therewith and longitudinally adjustable thereon, each of the said working heads having a lateral aperture therethrough including a bearing surface, the periphery of the shaft adapted to slidably engage the said bearing surface of the aperture, each of the heads having a keyway extending radially of the head and outwardly through the surface of the aperture, the shaft having a radial longitudinally extended slot therein parallel to the shaft axis, a longitudinally adjustable lift bar in the base of said slot, a radially movable locking bar spaced radially outwardly of the lift bar in the slot for moving the locking bar, said locking bar having an elongated edge extending toward the keyway and adapted to extend at least partially into the keyway, a key receivable within the said keyway having one edge thereof extending toward the outer edge of the locking bar, said edge of the key being spaced from the surface of the aperture and inwardly of the keyway, resilient securing means extending between the respective edges of the key and the locking bar, the said resilient means being engagable by the respective edges of the key and locking bar when the locking bar is radially adjusted outwardly toward the head and into the keyway for fixing the position of the heads longitudinally of the shaft.

8. A multiple head lock for printer-slotters and the like as claimed in claim 7 including means for retaining the key within the keyway.

9. A multiple head lock for printer-slotters and the like as claimed in claim 7 including means for withdrawing the lock bar from the keyway in the heads when the lift bar is adjusted to a point of releasing pressure thereon.

10. A multiple head lock for printer-slotters and the like as claimed in claim 7 wherein the resilient means is attached to the edges of the keys extending toward the lock bar.

11. A multiple head lock for printer-slotters and the like as claimed in claim 7 wherein the resilient means is attached to the outer edge of the lock bar extending toward the keyway.

References Cited by the Examiner

UNITED STATES PATENTS

| | | | |
|---|---|---|---|
| 2,699,338 | 1/1955 | Rue et al. | 83—665 X |
| 2,888,076 | 5/1959 | Lanstrom | 83—665 |

FOREIGN PATENTS

| | | |
|---|---|---|
| 870,927 | 6/1961 | Great Britain. |

WILLIAM W. DYER, Jr., *Primary Examiner.*

J. M. MEISTER, *Assistant Examiner.*